United States Patent [19]

Kirk

[11] Patent Number: 4,550,656

[45] Date of Patent: Nov. 5, 1985

[54] VEGETABLE PEELER

[76] Inventor: Norbert A. Kirk, 1458 West Belle Plaine, Chicago, Ill. 60613

[21] Appl. No.: 645,758

[22] Filed: Aug. 30, 1984

[51] Int. Cl.[4] .......................... A23N 7/00; A47J 17/00
[52] U.S. Cl. ...................................... 99/590; 30/123.6; 99/536; 99/584; 99/586; 99/592
[58] Field of Search ................ 99/516, 536, 539–541, 99/584, 586, 588–592, 623; 30/123.3, 123.5, 123.6, 299

[56] References Cited

U.S. PATENT DOCUMENTS

| | | | |
|---|---|---|---|
| 1,484,094 | 2/1924 | Szafranski | 99/586 X |
| 3,024,821 | 3/1962 | Bean | 99/586 |
| 3,417,799 | 12/1968 | Swanson | 99/584 |
| 4,228,559 | 9/1980 | Kirk | |
| 4,372,184 | 2/1983 | Fisher et al. | 99/545 X |

Primary Examiner—Timothy F. Simone
Attorney, Agent, or Firm—Larson and Taylor

[57] ABSTRACT

A vegetable peeler is provided which can be attached to a water faucet, allowing the user's hands to be freed for handling the vegetable and for the vegetable peels to be washed clear of the peeling blades through the action of water flowing out of the faucet.

4 Claims, 2 Drawing Figures

VEGETABLE PEELER

FIELD OF THE INVENTION

This invention relates to a self-cleaning vegetable peeler for peeling carrots, cucumbers, and the like.

BACKGROUND OF THE INVENTION

It is known to use, as a vegetable peeling device, a housing with blades mounted thereon as shown in Soviet Pat. No. 745,483, issued July 7, 1980. The housing is generally held stationary while the vegetable is pushed and/or pulled between the blades, causing it to be peeled. Holding the housing stationary by hand is clumsy and leaves only one hand for holding the vegetable so it has been proposed to mount the housing to a fixed surface by a clamp, as shown in Danish Pat. No. 58,433, published Feb. 17, 1941.

A common problem with vegetable peelers, however, is the accumulation of vegetable peels in the blades, causing clogging and jamming. This requires time-consuming interruptions in the peeling process to clean the blades. Even if the peels do not clog the blades, they still accumulate in or around the housing, again requiring time-consuming cleaning. Thus, there exists a need for a vegetable peeler which is continually self-cleaning and which does not suffer from the above-described peel accumulation problem, and that can be easily mounted so as to free the user's hands for handling the vegetable.

SUMMARY OF THE INVENTION

According to the invention, there is a vegetable peeler comprising a housing having at least one drain hole. Mounted in the housing are a plurality of peeling blades mounted in a way such that a thin layer of the vegetable will be peeled off when the vegetable is moved through the housing. Mounted on the housing is a means for attaching the housing to a water faucet and for directing water flowing out of the faucet through the housing so that vegetable peels are washed away. The peeling operation can thus be conducted over a sink drain/garbage disposal, eliminating the messy cleanup problems involved in vegetable peeling.

In one embodiment of the invention, the means for attaching the housing to a water faucet and directing water flowing out of the faucet through the housing is a threaded coupling.

In another embodiment, a slicing blade is mounted on one end of the housing in a way such that the vegetable is sliced after it is peeled when it is further moved through the housing.

DESCRIPTION OF THE PREFERRED EMBODIMENTS

Figure 1:
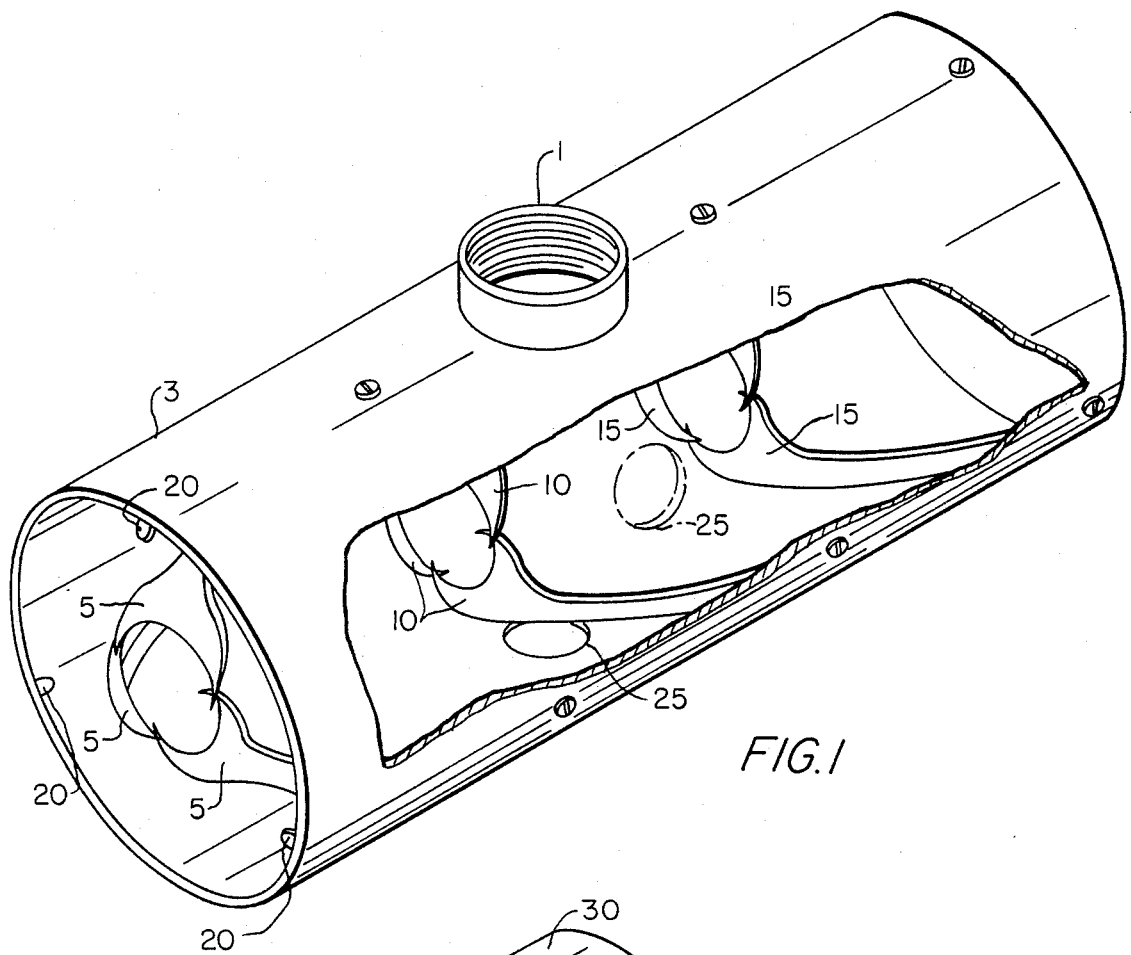
FIG. 1 represents a vegetable peeler according to the invention.

With reference to FIG. 1, a housing 3 has at least one drain hole 25. A means 1 for attaching housing 3 to a water faucet and for directing water flowing out of the faucet through housing 3 is mounted on housing 3. Rows of blades 5, 10, and 15 are mounted in housing 3 in a manner such that a vegetable moved through the housing from right to left will be peeled by the row of blades 15, then by row of blades 10, and then by row of blades 5. In one embodiment of the invention, a set of nipples 20 is attached to the end of housing 3 for the purpose of affixing attachments such as the slicing attachment of FIG. 2, to the end of housing 23.

Figure 2:
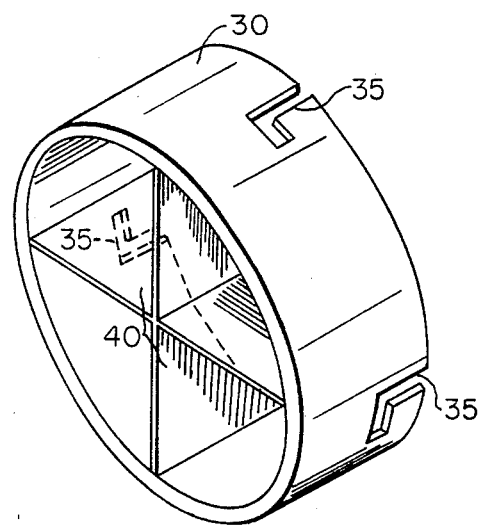
FIG. 2 represents a collar having slicing blades which can be attached to the vegetable peeler of FIG. 1.

With reference to FIG. 2, collar 30 has a set of L-shaped notches 35 adapted for receiving nipples 20 of housing 3 for attaching collar 30 to the vegetable peeler of FIG. 1. At least one radially directed blade 40 is mounted on the inside of collar 30. In the preferred embodiment depicted in FIG. 2, two blades 40 are notched so that they are mounted perpendicular to each other in collar 30.

The peeling blades of the vegetable peeler of FIG. 1 may be mounted in any of a number of well-known ways to allow for peeling of the vegetable. In a preferred embodiment of the invention, the blades have a curved cutting edge and are mounted in three rows of three blades each so that the three curved cutting edges form a continuous circular cutting edge as shown in FIG. 1. The blades are preferably made out of a flexible material and resiliently mounted in a way so that they are flexible enough to peel vegetables of varying size while maintaining contact between the vegetable and the cutting edge of the blades.

The means 1 for attaching housing 3 of the vegetable peeler of FIG. 1 to a water faucet and directing water flowing out of the faucet through the housing can be any of a number of well-known coupling means such as flexible rubber couplings and the like. In a preferred embodiment, however, the attaching and flow directing means 1 is a threaded coupling.

In use, housing 3 is screwed or otherwise attached onto a water faucet. A vegetable is pushed through housing 3 and between the peeling blades from the end closest to row of blades 15. As the lead end of the vegetable emerges from the end of housing 3 nearest to row of blades 5, the vegetable is pulled until it has completely passed through the peeling blades and the blades of any slicing attachment. Water flowing out of the faucet flows through attaching and flow directing means 1 into housing 3 and over peeling blades 5, 10, and 15, washing vegetable peels out of housing 3 through hole(s) 25. If the vegetable peeler is mounted to a faucet above a sink having a garbage disposal, the peels can be washed directly into the disposal, eliminating cleanup problems.

What is claimed is:

1. A vegetable peeler, comprising:
   an elongate housing having at least one drain hole;
   a plurality of sets of cooperating peeling blades mounted in said housing, said sets of peeling blades being spaced from an adjacent set along the longitudinal direction of said housing, each said set of peeling blades including at least two elongate peeling blades made of a flexible material which have a cutting edge at one end disposed centrally of said housing and adjacent the cutting edges of the others of said peeling blades of a respective set and at the other end are attached to said housing such that said cutting edges of a set of peeling blades provide an area therebetween smaller than a vegetable which is received therebetween in order to peel a thin layer from the vegetable as the vegetable is moved longitudinally through said housing and said adjacent cutting blades of a set are forced apart; and a means mounted on said housing for immovably attaching said housing to a water faucet and for directing water flowing out of the faucet through said housing whereby vegetable peels produced by said sets of peeling blades are washed out of said housing.

2. A vegetable peeler as described in claim 1 wherein said attaching and flow directing means is a threaded coupling.

3. A vegetable peeler as described in claim 2, further comprising at least one slicing blade mounted on one end of said housing in a way such that said vegetable is sliced after it is peeled when it is moved through said housing.

4. A vegetable peeler as described in claim 1 wherein each said cutting edge of said peeling blades are circular shaped from one end to the other.

* * * * *